United States Patent
MacGillivray et al.

(10) Patent No.: US 6,293,499 B1
(45) Date of Patent: Sep. 25, 2001

(54) MODULAR, PRODUCIBLE, TESTABLE AND SERVICEABLE SPACECRAFT DESIGN

(75) Inventors: Charles Scott MacGillivray, Orange, CA (US); Bruce Glen Loosli, Kent, WA (US); David Lee Gerhardt, Redondo Beach; Courtney Ross Weiss, Mission Viejo, both of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/440,998

(22) Filed: Nov. 16, 1999

(51) Int. Cl.$^7$ ............... B64G 1/00; B64G 1/22; B64G 1/44; F03H 5/00
(52) U.S. Cl. ............... 244/158 R; 244/173
(58) Field of Search ............... 244/158 R, 159, 244/173

(56) References Cited

U.S. PATENT DOCUMENTS

| | | | |
|---|---|---|---|
| 4,880,187 | 11/1989 | Rourke et al. | 244/172 |
| 4,943,014 | 7/1990 | Harwood et al. | 244/158 R |
| 4,964,596 | 10/1990 | Ganssle et al. | 244/158 R |
| 5,344,104 | 9/1994 | Homer et al. | 244/158 R |
| 5,755,406 | 5/1998 | Aston et al. | 244/158 R |
| 5,779,195 | 7/1998 | Basutbakur et al. | 244/161 |
| 5,791,600 | 8/1998 | Thompson | 244/159 |
| 5,798,574 | 8/1998 | Coronel | 307/9.1 |
| 5,839,696 | 11/1998 | Caplin et al. | 244/159 |
| 5,870,063 | 2/1999 | Cherrette et al. | 343/85.3 |
| 5,897,078 | 4/1999 | Burnham et al. | 244/177 R |
| 5,931,418 * | 8/1999 | Eller et al. | 244/158 A |
| 6,086,020 * | 7/2000 | Machiussi | 244/158 R |
| 6,138,951 * | 10/2000 | Budris et al. | 244/158 R |
| 6,196,501 * | 3/2001 | Hall et al. | 244/158 R |

* cited by examiner

Primary Examiner—Charles T. Jordan
Assistant Examiner—Christian M. Best
(74) Attorney, Agent, or Firm—Harness Dickey & Pierce P.L.C.

(57) ABSTRACT

A spacecraft comprised of a plurality of functionally organized, fully independent modules. Selected ones of the modules are moveable foldably in a "clamshell"-like manner between assembled positions, wherein various components of the spacecraft are generally not readily accessible, to a service position in which virtually all of the components of the spacecraft are substantially readily accessible for service or testing. Logically organized and routed harnesses comprised of numerous electrical and mechanical elements enable the clamshell-like folding movement of selected modules. Conventional electrical and mechanical connectors associated with the harnesses permit quick detachment and complete removal of selected modules from the spacecraft. The fully modular design significantly reduces the time required to gain access to the components on each of the modules and eliminates time consuming and extensive disassembly procedures that would ordinarily be required when performing service or test procedures on the spacecraft. The fully modular configuration also permits parallel manufacturing and testing of the independent modules, thus significantly reducing the design-to-market cycle time for the spacecraft. The modular design also facilitates replacement of selected modules with modified modules to produce derivative spacecraft or to tailor the performance of the spacecraft to better meet the needs of a particular mission.

27 Claims, 7 Drawing Sheets

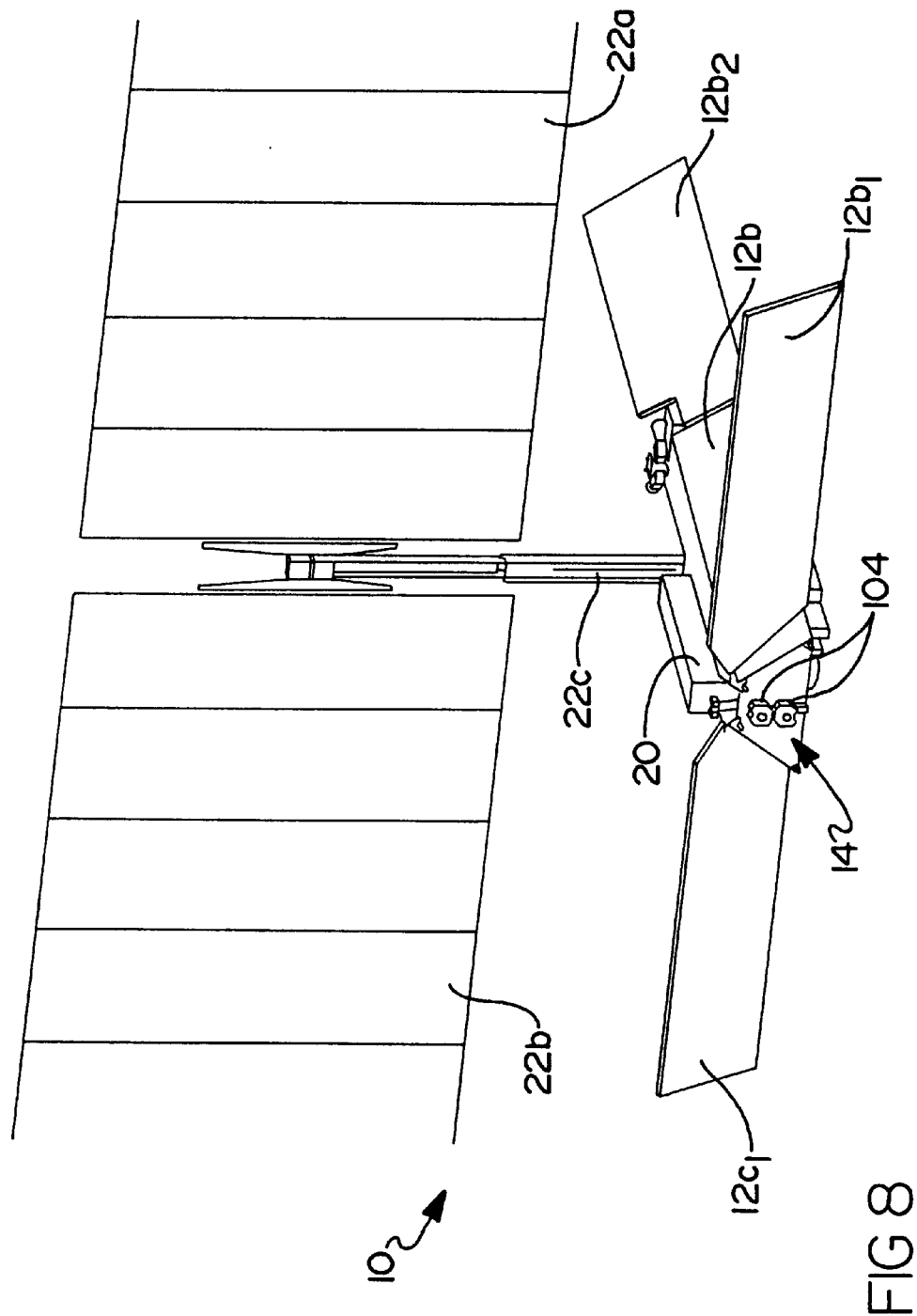

MODULAR, PRODUCIBLE, TESTABLE AND SERVICEABLE SPACECRAFT DESIGN

TECHNICAL FIELD

This invention relates to spacecraft, and more particularly to a spacecraft formed by a number of independently removable, testable and serviceable modules which simplify and expedite the manufacture, testing and service of the spacecraft, and which enable modifications and/or future variations of various modules of the spacecraft to be easily integrated and implemented.

BACKGROUND OF THE INVENTION

Background Art

Present day approaches to spacecraft design are often single-focused on the goal of achieving compliance with technical parameters governing mission performance, such as the power required by the spacecraft, its mass or volume of payload. This single-minded design approach often produces spacecraft which are unique for each new program or application, and which have little or no components or subassemblies in common with one another. Thus, since each spacecraft must essentially be designed as a unique vehicle, the design-to-market cycle time of producing a spacecraft is quite long. Presently, a spacecraft designed for a specific application may take as long as 36–40 months or more to design, construct and test before the spacecraft is ready to be launched. These drawbacks lead to significant non-recurring labor costs, lengthy production cycle time, increased scrap materials, and repeated redesign of various subsystems of the spacecraft.

Another significant drawback with many present day spacecraft designs is the lack of serviceability. For example, the various subsystems of the spacecraft are often interconnected by a highly complex plurality of electrical, mechanical, fluid carrying and thermal elements. These elements are routed in a complex arrangement to the various components of the spacecraft and are typically not capable of being quickly and easily disconnected, should one or more subsystems of the spacecraft need to be accessed for service and/or testing. Disassembly and uncoupling of one major subsystem often requires extensive disassembly of cabling, mechanical coupling elements, fluid transfer lines and thermal elements, many of which are not capable of being quickly separated from their associated components. Often, fluid lines need to be physically cut and then re-welded or re-brazed, and then pressure tested, during re-assembly. Thus, uncoupling and reassembly of even one major subsystem often takes several days, or even weeks, to complete.

With present day spacecraft, the organization of its various subsystems are further not arranged in logical, fully functional, modular sub-component form to facilitate access to, service and testing of functionally related sub-components. This further contributes to extremely time consuming disassembly procedures being required before access can be gained to the specific subsystems of the spacecraft being serviced or tested. Often, a significant number of other unrelated subassemblies of the spacecraft may need to be removed before being able to access and test the desired subassembly/component. These drawbacks with present day spacecraft designs contribute significantly to their lengthy design-to-market cycle times.

As will be appreciated, the inability to quickly and easily access and/or uncouple and physically remove a particular subsystem of the spacecraft introduces significant additional cost, in terms of labor, into the overall cost of manufacturing the spacecraft. This is in large part because of the significant testing that must be performed on the numerous components of the spacecraft before the spacecraft is ready for launch. It also can cause significant time delays which could jeopardize delaying a planned launch of the spacecraft if a portion of the spacecraft has to be disassembled, re-tested and then reassembled shortly before a scheduled launch.

Since most present day spacecraft are designed with the goal of meeting particular customer requirements, often the subassemblies of the spacecraft are not usable in subsequent spacecraft, thus requiring new design efforts when designing and manufacturing a subsequent spacecraft to different customer specifications. This also contributes significantly to the high cost of present day spacecraft and the long design-to-market cycle times needed to produce such spacecraft. The re-designing of the various subassemblies of the spacecraft also prevents the cost savings that would otherwise come with the manufacture of standardized modules or subassemblies which could be used on more than one spacecraft.

Still another disadvantage of the present day spacecraft design is the inability to easily integrate improvements into various subsystems or subassemblies of the spacecraft without requiring re-design of other subsystems. Thus, if one spacecraft required a more powerful propulsion system, it would be much more cost effective and require much less design time if merely the propulsion system of the spacecraft could be re-designed and then either re-introduced into the same spacecraft or used in a different spacecraft without interfering with the design or operation of other subsystems, and without requiring disassembly of a major portion of the spacecraft.

It is therefore a principal object of the present invention to provide a spacecraft comprised of a plurality of functionally independent major modules which may be independently accessed and/or removed from the spacecraft without requiring significant and time consuming disassembly of numerous electrical, mechanical, fluid carrying and thermal interconnecting components securing the affected module to other modules of the spacecraft. In this manner specific modules may be accessed, serviced and tested without requiring significant additional disassembly of other modules of the spacecraft. This would significantly reduce the man hours required for testing and servicing the various modules of the spacecraft as well as the cost associated with such procedures.

It is another object of the present invention to provide a spacecraft having a highly modular design such that the various modules thereof may be used in various derivative and future spacecraft applications.

It is still another object of the present invention to provide a spacecraft comprised of a plurality of functionally independent modules each having its electrical, mechanical, fluid carrying and thermal interconnecting elements configured such that each module may be selectively moved, relative to one another, to enable access to portions of the spacecraft which would otherwise only be accessible through hours, or possibly days or weeks, of time consuming disassembly efforts.

It is yet another object of the present invention to provide a method of manufacturing a spacecraft which involves using functionally independent modules that are secured to one another via fastener assemblies including quick disconnect fasteners and conventional electrical connectors, to thereby enable parallel manufacturing, design, testing and/or removal of selected modular subsystems, to thus significantly reduce the overall time required to construct, test and service the various major functional subsystems of the spacecraft.

SUMMARY OF THE INVENTION

The above and other objects are provided by a fully modular spacecraft in accordance with preferred embodiments of the present invention. In one preferred embodiment the spacecraft comprises a plurality of functionally independent modules which may be quickly and easily released from fixedly held positions by actuating a selected plurality of quick release fastener assemblies associated with the module requiring access thereto. Each of the modules are further constructed such that all of the electrical, mechanical, fluid carrying and thermal elements are arranged and routed in such a manner to permit each of the modules to be moved foldably in a "clamshell"-like fashion between a compact assembled position, wherein its various components are not generally readily accessible, to a service or test position, in which all, or substantially all of the components on the selected module, as well as many of the components on adjacent modules, are readily accessible. This fully modular approach and clamshell-like folding movement of the modules of the spacecraft drastically reduces the time and disassembly effort required to gain access to the numerous sub-components disposed on each of the modules when performing service and/or testing on the numerous components of the spacecraft. This feature also eliminates the need to disassemble/disconnect various other electrical cabling, thermal elements or fluid transfer or support lines, or other components, before access can be gained to the desired component, which is a significant drawback of present day spacecraft designs.

The primary modules of the spacecraft of the present invention comprise a bus electronics module, a payload module, an electrical power module and a propulsion module. Each of these modules essentially forms a fully functional, line replaceable unit (LRU) that functions as a substantially separate and discrete subsystem having a complex plurality of logically related subcomponents. Each of the modules can be quickly and easily coupled to and uncoupled from the other modules of the spacecraft such that each module may be separately fabricated, tested, delivered and installed to facilitate rapid construction and testing of the spacecraft.

The fully modular design of the spacecraft of the present invention also enables the various modules to be designed such that they may be used with other derivative spacecraft, thus significantly shortening the time-to-market cycle time for design and manufacture of such derivative spacecraft. This modular approach further enables one module of the spacecraft to be replaced with a module having different performance characteristics without requiring modification or redesign of other modules of the spacecraft.

A principal advantage of the modular spacecraft of the present invention is the ability to quickly and easily access, and remove if necessary, only those modules of the spacecraft that may require service or testing. This is accomplished through standardized electrical, mechanical and thermal connectors and couplings which permit rapid manual disconnection, if needed, to completely separate one module from the remainder of the spacecraft. Thus, if the need arises to gain access to or completely remove a module shortly before a scheduled launch of the spacecraft, the fully modular design of the spacecraft permits service and testing of one or more modules within a greatly reduced time frame, and with significantly reduced labor expense in terms of man hours.

Still another important advantage of the modular spacecraft of the present invention is the ability to rapidly modify the performance characteristics of the spacecraft to accommodate new power, payload or thermal requirements. For example, if the power requirements of the spacecraft are reduced, the design of the electrical power module can be quickly and efficiently scaled down to meet the lesser power requirements. This can be accomplished simply by removing and modifying the electrical power module with little or no modification to the other major modules of the spacecraft. If thermal loads are reduced, the number of other deployable components such as radiators and/or thermal heat pipes may also be significantly reduced. In production, these changes can be easily managed. With conventional spacecraft designs, even minor design changes can take many months to implement and test, while such design modifications could be implemented within days or weeks with the spacecraft of the present invention. Thus, the modular spacecraft of the present invention lends itself well to retrofitting procedures when one or more of the modules thereof require modifications to suit the requirements of a specific mission.

The modular design of the spacecraft of the present invention also enables fast, efficient and consistently high quality manufacturing of the spacecraft. The various modules may be delivered pre-tested for assembly to a central location, assembled and then fully tested to ensure that electrical and mechanical connections are securely made. Beyond thermal cycle testing to assess the interconnections, no other environmental tests need be performed. This approach allows very high volume integration and testing of a much greater number of spacecraft, thus significantly reducing the manufacturing and test time required for each spacecraft.

In one preferred embodiment of the present invention the payload module comprises an assembly having a central payload panel and a pair of outer payload panels. At least one of the outer payload panels is movable in a folding manner relative to the central payload panel to enable access to the interior area of the payload module if needed. The bus electronics module is also movably secured to the payload module so that it can be folded outwardly therefrom to enable even greater unimpeded access to the payload module. Quick disconnect fasteners allow the payload panels, as well as the bus electronics module, to not only be uncoupled from one another to permit folding movement, but also to be quickly removed from the remainder of the spacecraft for service and/or testing if needed.

BRIEF DESCRIPTION OF THE DRAWINGS

The various advantages of the present invention will become apparent to one skilled in the art by reading the following specification and subjoined claims and by referencing the following drawings in which:

FIG. 8 is a perspective view of the spacecraft of the present invention within its solar array panels and heat radiators fully deployed.

DETAILED DESCRIPTION OF THE PREFERRED EMBODIMENTS

Figure 1:
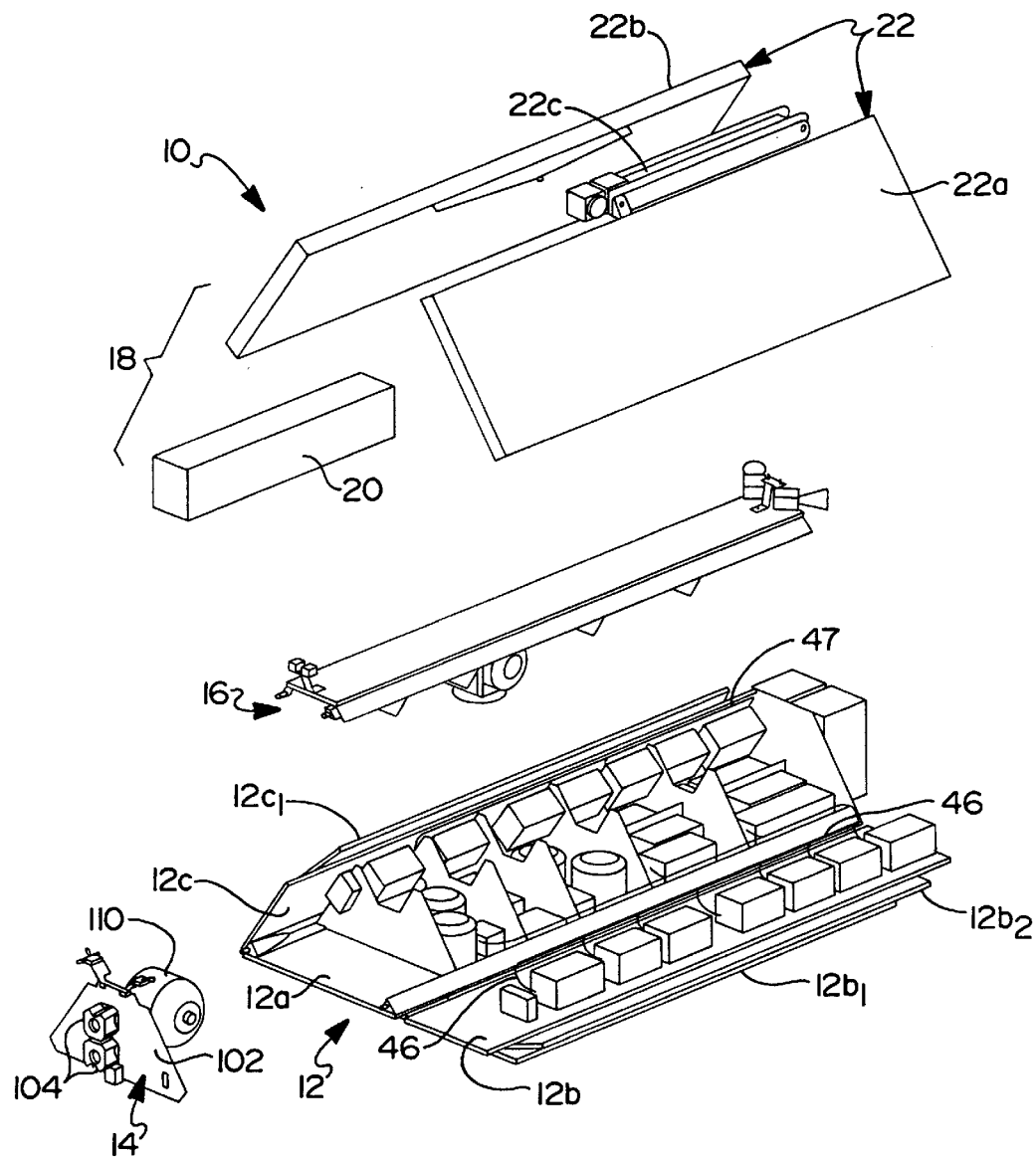
FIG. 1 is an exploded perspective view of the various modules of a spacecraft in accordance with a preferred embodiment of the present invention.

Referring to FIG. 1, there is shown a fully modular spacecraft 10 in accordance with a preferred embodiment of the present invention. The spacecraft 10 generally comprises a payload assembly module 12, a functionally independent propulsion module 14, a functionally independent bus electronics module 16 and a functionally independent electrical power module 18. The payload module 12 is comprised of preferably three distinct, fully independent payload panels 12a, 12b and 12c, although it will be appreciated that a larger or smaller plurality of payload panels could be incorporated depending on the specific needs of the mission which the spacecraft 10 will carry out. Payload panel 12a forms a central payload subassembly while panels 12b and 12c form outer payload subassemblies which are disposed adjacent opposite longitudinal edges of the central payload panel 12a. Outer payload panel 12b typically includes a pair of deployable heat radiators $12b_1$, and $12b_2$ secured thereto for assisting in dissipating heat from the electronic components mounted on the outer payload panel 12b. It will be appreciated that the other payload panels 12a and 12c may include between zero and two such similar heat radiators although only one such other radiator $12c_1$ is visible in FIG. 1. Electrical power module 18 provides electrical power to all of the modules 12–16 of the spacecraft 10. The spacecraft 10 is shown in its fully assembled, pre-deployed condition in FIG. 2.

With further reference to FIG. 1, the electrical power module 18 comprises a battery assembly 20 and a solar array assembly 22. The solar array assembly 22 is comprised of solar panels 22a and 22b, and a solar array deployment mast 22c for deployably extending the solar array panels 22a and 22b. In one preferred form the battery assembly 20 comprises a lithium ion battery assembly and the solar array panels 22a and 22b comprise silicon solar array panels. The electrical power module 18 is secured to the bus electronics module 16 and movable therewith, as will be described further momentarily.

Figure 2:
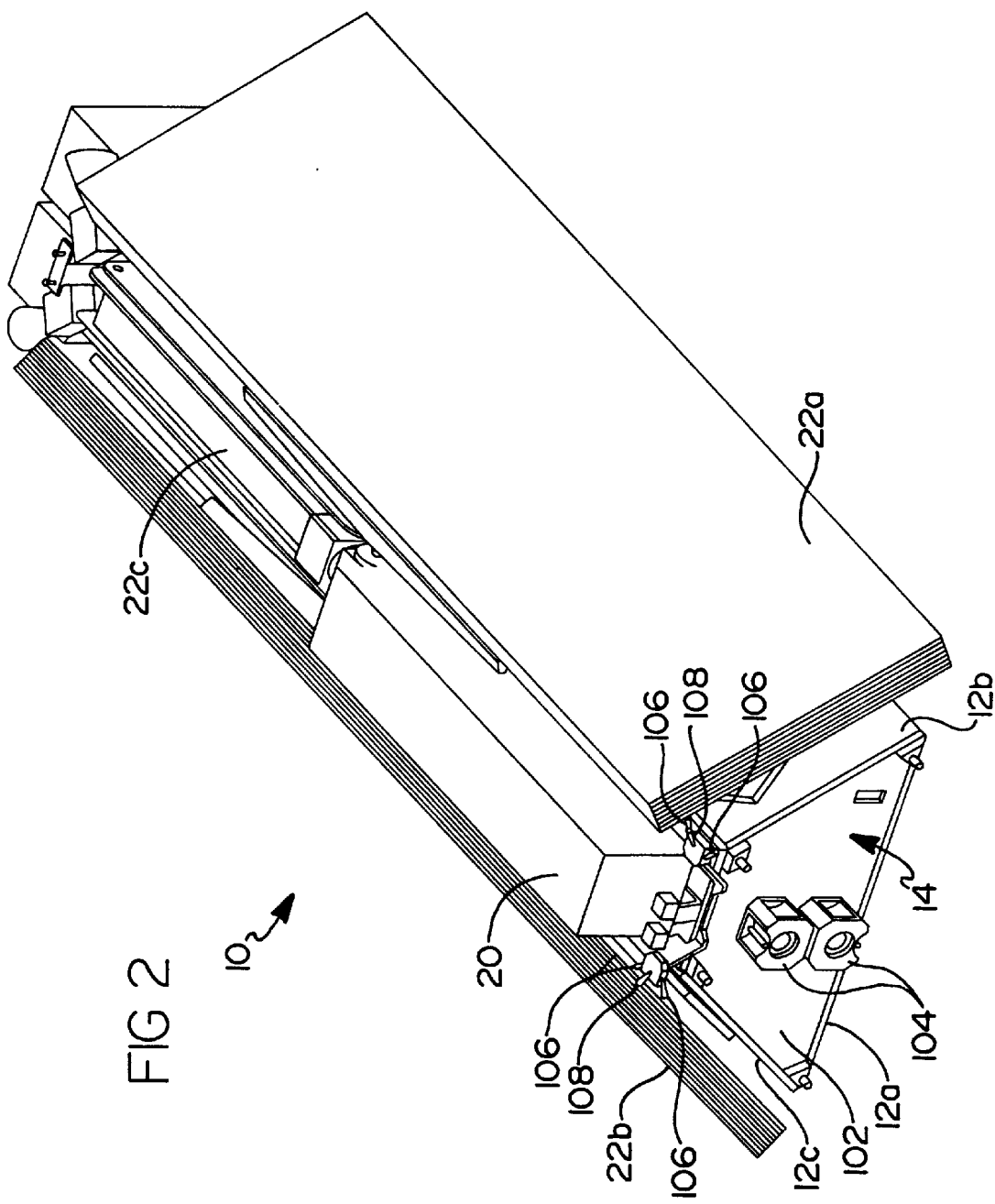
FIG. 2 is a perspective view of the spacecraft of FIG. 1 shown in a fully assembled arrangement.
Figure 3:
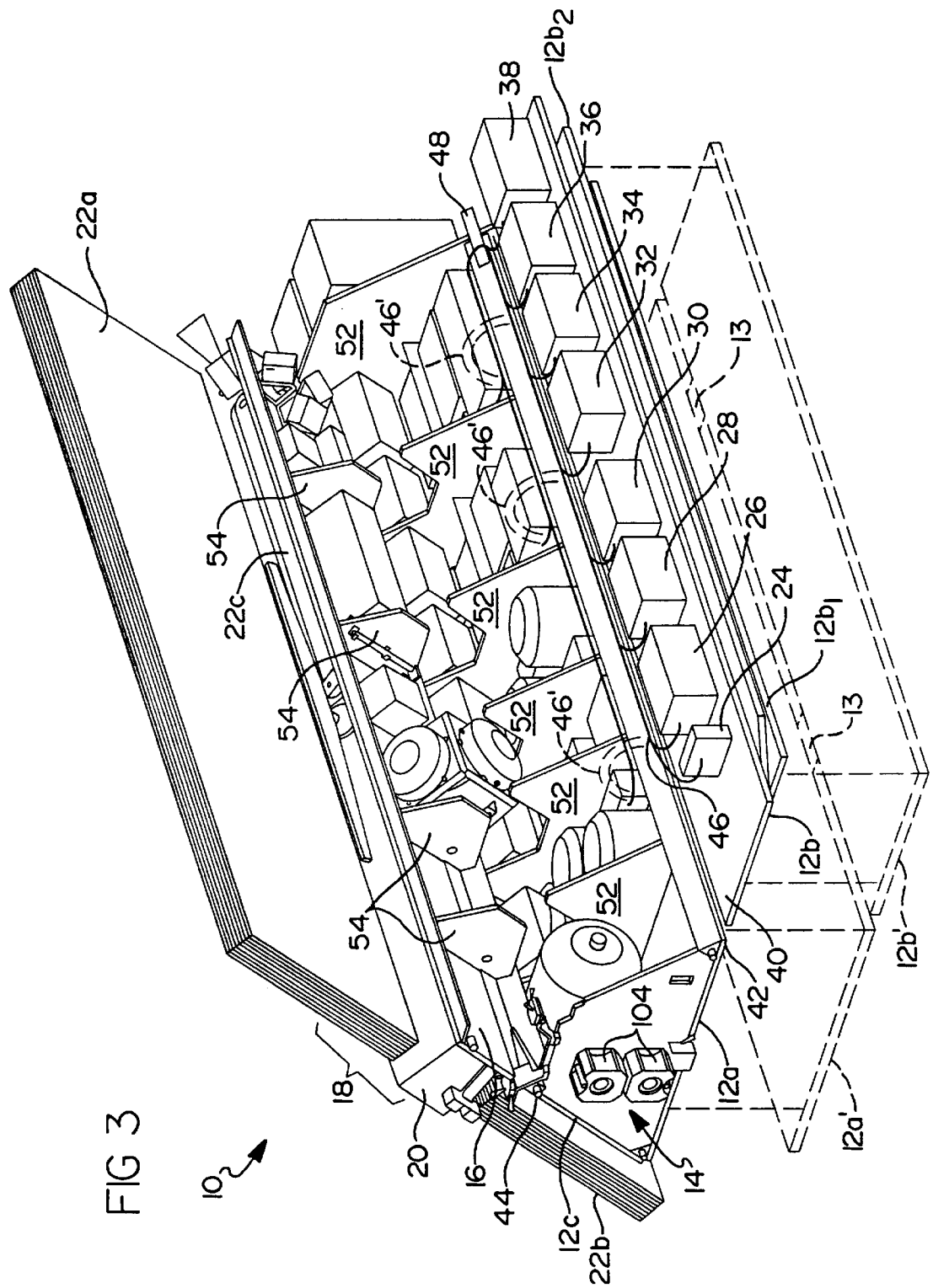
FIG. 3 is a perspective view of the spacecraft of FIG. 1 showing one of the payload module panels folded into a service position enabling access to the components mounted thereon as well as to components mounted on other panels of the payload module, and further illustrating the routing of a harness that permits folding movement of the outer payload panel without interference from various electrical cables, mechanical elements, fluid lines and thermal elements.

It is a principal advantage of the present invention that each of the modules 12, 14, 16 and 18 described above is constructed as an independent, fully functional module capable of being readily interfaced with one or more of the other modules in a manner that permits selected ones of the modules 12, 14, 16 and 18 to be moved in a folding manner relative to one another between an "assembled" position, such as shown in FIG. 2, and a "service" or "test" position, such as shown in FIG. 3, to permit easy access to the numerous components disposed on each of the modules 12–18. This folding movement is accomplished in part by logical routing of a large plurality of electrical cables, fluid lines, thermal elements, etc., in a manner such that these elements do not interfere with folding movement of the modules 12, 14, 16 and 18 when access to the various components on the modules is required. Thus, there is no risk of breakage or need to disconnect or cut the various fluid transfer or support lines associated with each module 12–18. Heat transfer across the modules 12–18 further occurs without breaking any fluid lines or heat pipes. Such movement would not be possible with prior designs of spacecraft without extensive disconnection and cutting of various fluid transfer lines and other mechanical, electrical and thermal elements.

With further reference to FIG. 3, the spacecraft 10 can be seen with the bus electronics module 16 and electrical power module 18 extended pivotably away from payload panel 12b, and with panel 12b folded outwardly into the service position. In this orientation, a large plurality of the components on several of the modules 12–18 are accessible. More specifically, access to numerous components mounted on the central payload panel 12a, the outer payload panel 12c, the bus electronics module 16, as well as to components 24–38 mounted on outer payload panel 12b, are readily accessible. It will be appreciated that components 24–38, as well as the other components mounted on the payload panels 12a, 12b, 12c and on the bus electronics module 16, represent highly complex electrical, electromechanical and thermal components, and have been shown in a highly simplified fashion.

Referring further to FIG. 3, outer payload panel 12b is intended to be moved foldably about a longitudinal axis extending parallel to its longitudinal edge 40 and also to longitudinal edge 42 of the central payload panel 12a. The bus electronics module 16 and the electrical power module 18 are also intended to be moved as a single unit pivotably along a longitudinal axis extending along an upper corner of the propulsion module 14, at the point indicated by reference numeral 44. The highly complex collection of electrical wiring, fluid lines and thermal elements leading from each of the components 24–38 on the outer payload panel 12b is collected and routed to form a harness 46 that extends along the longitudinal edge 40 of the outer payload panel 12b. Thermal coupling is by means of bolted interfaces and flexible heat pipes to enable folding movement, thus precluding the need to cut the heat pipes to allow movement of the modules 12–18. The harness 46 electrically couples the components 24–38 to various other components on the central payload panel 12a, as well as to other ones of the modules 12–18. Importantly, the routing of the wiring harness 46 permits unimpeded folding movement of the outer payload panel 12b between its assembled and service positions.

With brief reference again to FIG. 1, it can be seen that a second harness 47 is preferably included for facilitating pivoting movement of the bus electronics module 16 while allowing this module to remain operatively coupled to other ones of the modules 12–18. While only two major harnesses 46 and 47 are shown, it will be appreciated that additional harnesses could be employed if needed to help facilitate removal of other modules 12–18 from the spacecraft 10.

It will also be appreciated that the harnesses 46 and 47 could be replaced by a larger plurality of smaller harnesses.

For example, harness 46 in FIG. 3 could be replaced by a plurality of smaller harnesses 46' which extend directly to suitable connectors associated with the central payload panel 12a. This arrangement would eliminate the need to route all of the electrical conductors to one end of the outer payload panel 12b. It will be appreciated that any arrangement of harnesses that permits folding movement of the modules 12–18 is contemplated as being within the scope of the present invention.

When folding movement of one or more of the modules 12–18 is required to obtain access to its components, it will be appreciated that conventional frame handling tooling, such as components 12a' and 12b', shown in FIG. 3, will preferably be employed. These components are rigid, frame-like members made from aluminum or another suitably strong material and attach securely at suitable attachment points on the payload panels 12a and 12b with bolts or other conventional fastening elements. The two frame handling tools 12a' and 12b' are coupled together by hinging mechanisms 13 which permit and control movement of the outer payload panel 12b to allow the panel 12b to be pivoted into the position shown in FIG. 3. It will be appreciated that other such frame handling tooling will need to be attached to the other modules 12–18 to facilitate convenient pivoting movement. While only two hinges 13 have been shown in simplified form, it will be appreciated that a greater number of hinges may need to be employed to adequately support the weight of the outer payload panel 12b during pivotal movement thereof.

With further reference to FIG. 3, the entire removal of outer payload panel 12b from the remainder of the spacecraft 10 may be accomplished by providing a suitable plurality of connectors, indicated by rectangular box 48, preferably at an intermediate point along the harness 46. Connectors 48 are comprised of simple, commercially available electrical and mechanical connectors which can be quickly and easily manually separated to effect removal of the entire payload panel 12b from the remainder of the spacecraft 10 if needed. It will be appreciated, however, that other points of attachment could be employed for the harness 46. For example, harness 46 could be secured by suitable connectors to mating connectors mounted on the central payload panel 12a, rather than at an intermediate point along the length of harness 46. Other attachment points will be apparent to those of ordinary skill in the art, the only limitation being that the harness 46 still permits full, unimpeded folding movement and quick separation of its associated panel 12b. This feature permits the entire outer payload panel 12b to be removed from the spacecraft 10 for service and/or testing, if needed, without requiring significant disassembly of any other module 12–18 or wiring, fluid carrying elements or thermal elements associated with other modules 12–18 of the spacecraft 10.

It will be appreciated that the above-described feature provides a number of significant advantages over present day spacecraft designs which do not permit for rapid access to and/or removal of various subsystems without a significant degree of disassembly being required of the spacecraft 10. The ability to quickly access and remove, if necessary, an entire functional module 12–18 without undertaking massive disassembly efforts of numerous other subsystems of the spacecraft 10 provides for a significant savings in the man hours needed to service, test and repair the various and complex components associated with each functional module 12–18 of the spacecraft 10. Accordingly, disassembly procedures that previously took days or months to perform on previous spacecraft designs can be performed often in several hours on the spacecraft 10.

Referring further to FIG. 3, to assist in providing structural rigidity to the spacecraft 10, a plurality of bulkheads 52 and 54 may be provided. If used, bulkheads 52 may be attached fixedly to portions of the central payload panel 12a while bulkheads 54 may be attached fixedly to portions of the bus electronics module 16. The bulkheads 52 and 54 engage one another when the bus electronics module 16 is in its assembled position and form a means for providing additional structural support to the various modules 12–18 when the spacecraft 10 is in its fully assembled position.

Figure 4:
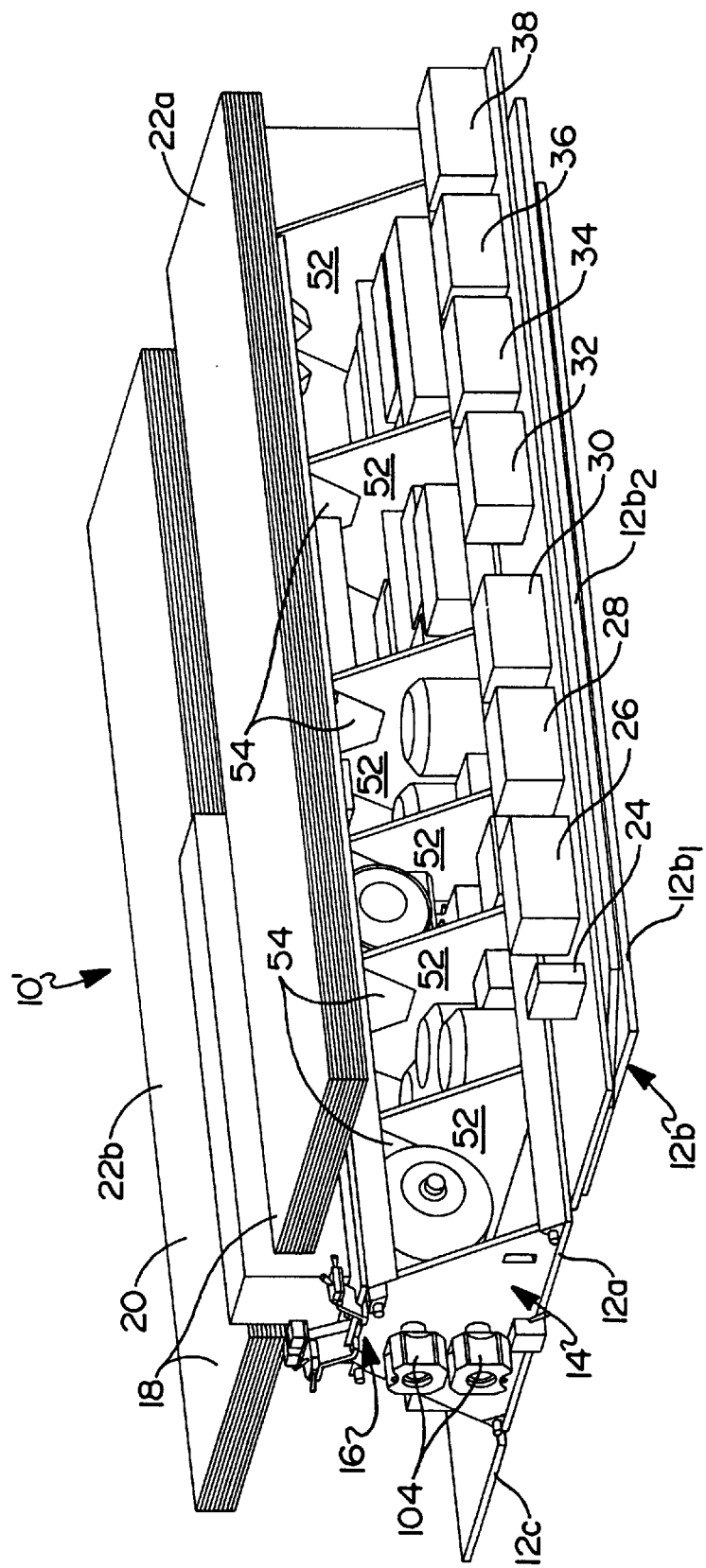
FIG. 4 is a perspective view of an alternative preferred embodiment of the present invention wherein the two outer panels of the payload module are both capable of folding movement, and illustrating both payload module outer panels folded outwardly into their service positions.

It will also be appreciated that outer payload panel 12c could also be configured for folding movement relative to the central payload panel 12a if desired. This is illustrated by the alternative embodiment 10' of the spacecraft shown in FIG. 4. This folding movement of outer payload panel 12c could further be accomplished with little or no modification to the spacecraft 10. Outer payload panel 12c could also be formed to be completely removable from the spacecraft in a manner similar to that illustrated for outer payload panel 12b. The principal requirements would be a harness, such as harness 46, with suitable connectors enabling the outer payload panel 12c to be quickly separated from the remainder of the spacecraft 10. It will be appreciated that with this embodiment additional tooling may be required to further enhance the structural integrity of the spacecraft 10 during movement of the payload panels 12b and 12c, and further to better handle the weight of the outer payload panels 12b and 12c when these panels are in their service (i.e., extended) positions.

While the central payload panel 12a and the bus electronics module 16 have not been described as being completely readily removable from the spacecraft 10, it will be appreciated that such could be easily accomplished with suitable harnesses and connectors such as harness 46 and connectors 48.

Figure 5:
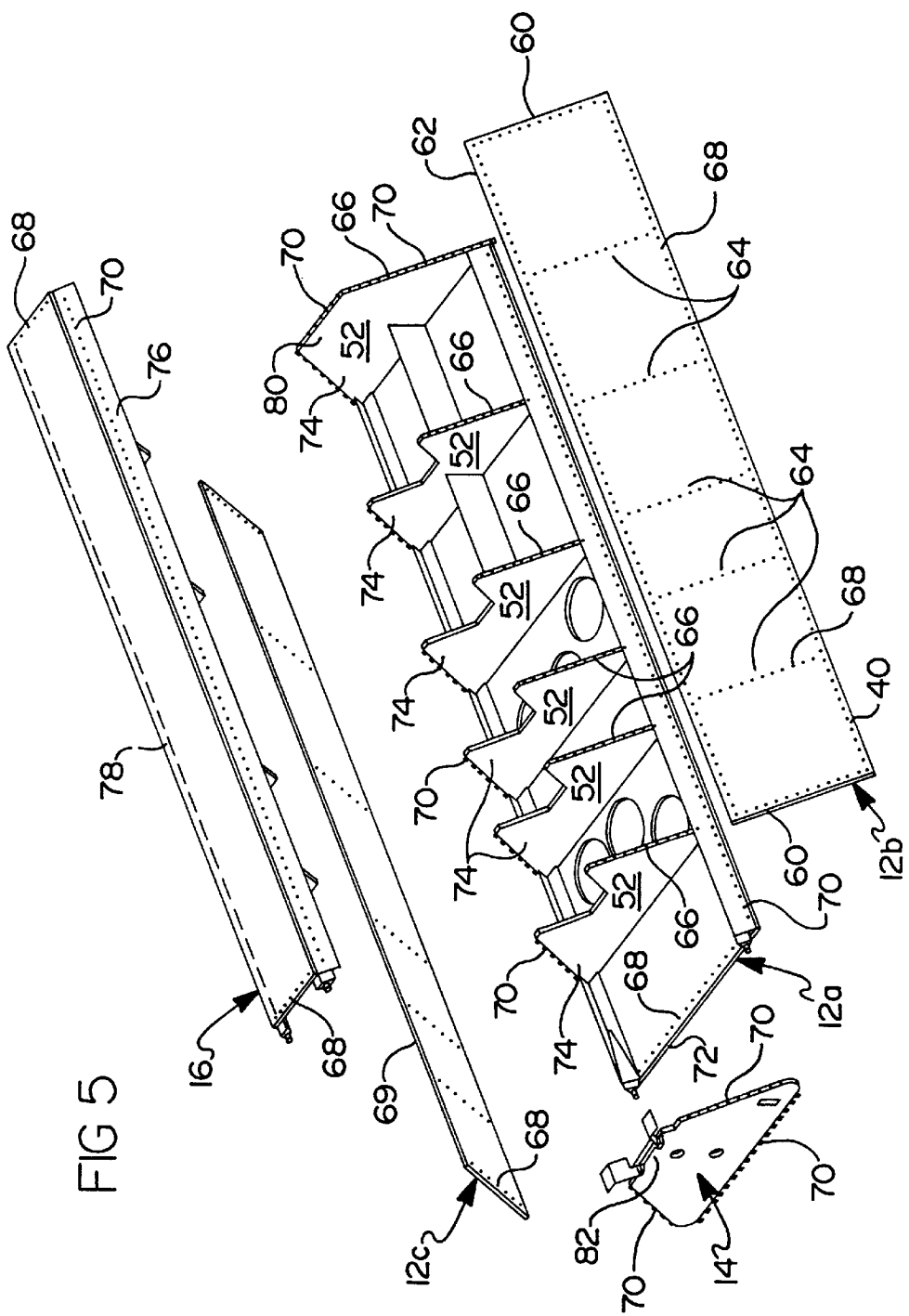
FIG. 5 is an exploded perspective view of the various modules of the spacecraft illustrating where fasteners may be used to releasably secure the modules to one another.

Referring now to FIG. 5, the payload panels 12a, 12b and 12c, the propulsion module 14, the bus electronics module 16 and the bulkheads 52 are shown in highly simplified form without the various components that would ordinarily be mounted thereon to illustrate the points where the modules 12–16 may be attached to one another through suitable quick disconnect mechanical fastener assemblies. Outer payload panel 12b is preferably secured along longitudinal edge 40, along ends 60, along longitudinal edge 62 and further along longitudinal sections 64 coinciding with the vertical edges 66 of the bulkheads 52 by a plurality of quick disconnect mechanical fasteners 68. Fasteners 68 may comprise any suitable form of quick disconnect type of connector forming a first element which is adapted to releasably engage with an associated second fastening element. For simplicity, fasteners 68 have been illustrated as circular dots.

With further reference to FIG. 5, the fastening elements 68 are secured to fastening elements 70, which are represented in highly simplified form by small squares. Fastening elements 70 represent second fastener components that can be quickly and easily secured to the fasteners 68. The propulsion module 14 may also be secured about substantially its entire periphery by the interconnection of fastening elements 68 disposed along edge 72 of the central payload panel 12a and fastening elements 70 disposed on the periphery of the propulsion module 14. Outer payload panel 12c may be similarly secured to vertical edges 74 of the bulkheads 52 by the connection of fastening elements 68 and 70. The bus electronics module 16 is preferably secured along its longitudinal edge 76 by the connection of fastening elements 70 disposed along edge 76 and fasteners 68 disposed along edge 62 of outer payload panel 12b. The bus electronics module 16 may also be secured by fasteners 68 connecting with fasteners 70 placed along an upper edge 80 of an endmost one of the bulkheads 52, and possibly also along an upper edge 82 of the propulsion module 14. Edge 78 of the bus electronics module 16 may also be secured to edge 69 of outer payload panel 12c via an additional plurality of fasteners 68 and 70.

It will be appreciated that the placement of the fasteners 68 and 70 shown in FIG. 5 is merely representative of one arrangement by which the modules 12–16 can be mechanically interconnected with one another to form a highly rigid structure that can still be disassembled quickly for service and/or testing. Accordingly, the preferred embodiments of the present invention are not limited to any specific layout or arrangement of fastener elements 68 and 70. Rather, any arrangement which holds the various modules 12–18 securely to one another, when fully assembled, and which still permits quick, convenient access to the fasteners 68 and 70 is contemplated as being within the scope of the present invention.

It will be appreciated that one or more suitable mechanisms could be employed for simultaneously releasing the fasteners 68 from fasteners 70 disposed along vertical edges 66 of the bulkheads 52 so that removal of the heat radiators $12b_1$ and $12b_2$ is not needed to gain access to fasteners 68. Such a structure could be formed by, for example, a plurality of elongated rods each extending underneath the radiator $12b_2$ and parallel to an associated one of the bulkheads 52, which can each be rotated about its longitudinal axis to engage each of the fasteners 68 along one vertical edge 66 simultaneously when it is turned. Alternatively, a rod could be disposed along and parallel to longitudinal edge 40 of payload panel 12b which cooperates with a plurality of rod-like elements disposed adjacent each vertical edge 66 to simultaneously release fasteners 68 from the bulkheads 52. This would enable the payload panel 12b to be released from the bulkheads 52 without first requiring the heat radiators $12b_1$ and $12b_2$ to be moved a predetermined amount for fastener access.

It is anticipated that an alternative preferred embodiment of the present invention could comprise a frame structure to which each of the modules 12–16 could be attached with a lesser plurality of mechanical fastener components. Thus, the drawing of FIG. 5 should be understood as being merely one preferred example of how the various modules 12–16 may be releasably secured to one another to permit quick and easy assembly and disassembly of the spacecraft 10.

Figure 6:
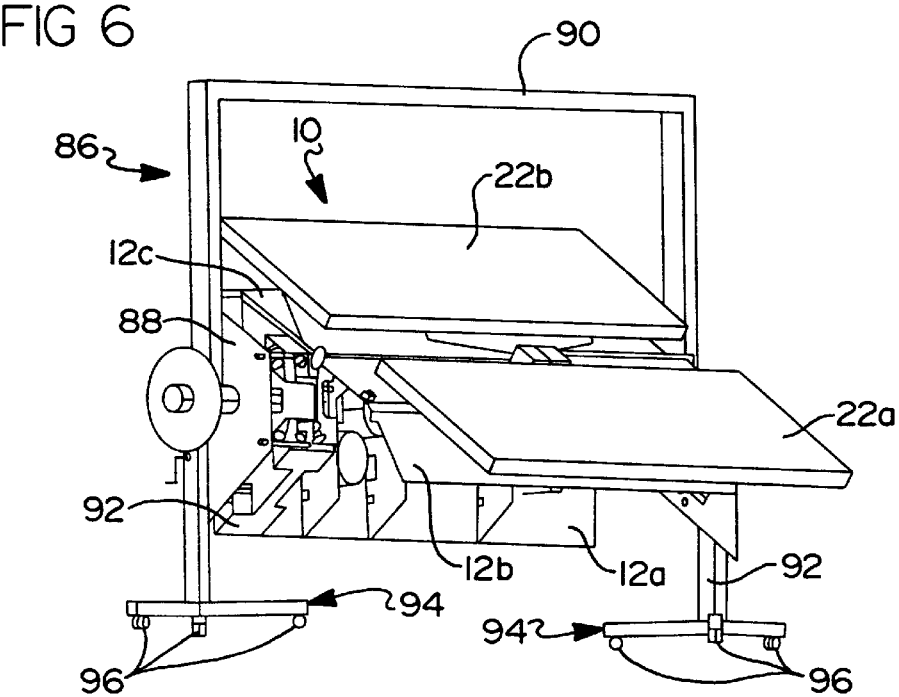
FIG. 6 is a perspective view of a supporting tool used to support the spacecraft of the present invention when performing testing or service on the spacecraft.

Referring now to FIG. 6, a supporting tool 86 is shown for supporting the spacecraft 10 to facilitate convenient service and testing thereof. The supporting tool 86 is adapted to be secured directly to portions of opposing frame handling end panels 88 (only one being shown in FIG. 6) via an inverted "U"-shaped upper frame member 90. Upper frame member 90 is in turn supported on lower frame elements 92, which are in turn supported on base assemblies 94. The base assemblies 94 have casters 96 or other mechanisms for permitting the entire supporting tool 86 to be moved as needed. In this manner, the entire spacecraft 10 can be supported in a convenient manner to permit ready access, testing and servicing on all areas of modules 12–18.

Figure 7:
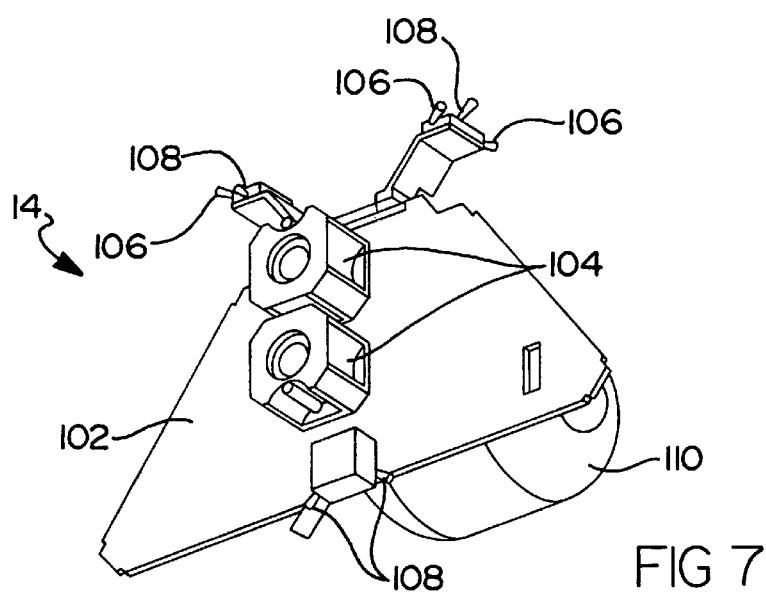
FIG. 7 is an enlarged perspective view of the propulsion module of the present invention.

Referring now to FIG. 7, the propulsion module 14 will be described in greater detail. As explained previously herein, the propulsion module 14 comprises a functionally independent component that can be readily removed from the spacecraft 10 by uncoupling electrical and mechanical connectors. This permits the propulsion module 14 to be accessed much more conveniently for service or testing. It also permits the propulsion module 14 to be completely removed from the spacecraft 10 with minimal disassembly/disconnection of connecting elements, and modified if needed to suit the needs of a particular application.

The propulsion module 14 includes a frame member 102 upon which is mounted a plurality of axial control thrusters 104, a first plurality of attitude control thrusters 106 and a second plurality of attitude control thrusters 108 (also visible in FIG. 2). A tank 110 containing propellant, which may comprise Xenon propellant, is also mounted to the frame 102 for supplying propellant to the thrusters 104, 106 and 108. In a preferred embodiment of the propulsion module 14, the frame member 102 comprises a pair of aluminum frame sheets between which is disposed a honeycomb panel to provide a relatively lightweight yet very structurally rigid and strong frame member 102. Locating the tank 110 on the inboard side of the frame member 102 also provides the advantage of protecting the tank 110 from damage caused by debris floating in orbit. The axial control thrusters 104 may comprise well known Hall thrusters. These thrusters are principally responsible for propelling the spacecraft 10 from drop off orbit to the operational orbit, but can just as readily be used for orbit maintenance purposes or plane changes.

Attitude control thrusters 106 and 108 are used principally for controlling the attitude (i.e., pitch, yaw and roll) of the spacecraft 10. Thrusters 106, in one preferred embodiment, comprise well known Resistojet thrusters. Thrusters 108, in one preferred embodiment, may comprise cold gas thrusters.

A principal advantage of providing all of the thrusters 104, 106 and 108 on one propulsion module 14 disposed at one end of the spacecraft 10 is that the routing of lengthy and complex fluid carrying tubing all over the spacecraft 10 is eliminated. This significantly simplifies and expedites movement and removal of the various other modules of the spacecraft 10. Just as importantly, the propulsive gasses from the thrusters 104, 106 and 108 are all directed such that they are not blown on any portion of the spacecraft 10.

Referring to FIG. 8, the spacecraft 10 is illustrated in its fully deployed orientation. Outer payload panel 12c can be seen to include a heat radiator $12c_1$. Deployment mast 22c assists in erecting and supporting solar array panels 22a and 22b in their fully deployed positions.

The spacecraft 10 of the present invention thus forms a fully modular spacecraft vehicle which allows rapid and convenient access to the numerous components on each of modules 12–18 thereof. The ability to move various modules in a folding manner between assembled and service positions to gain access to the components on each module, and completely remove a module if necessary, without requiring days or even weeks of complicated disassembly procedures, allows testing and service operations to be performed quickly and with significantly less cost to the spacecraft manufacturer. The fully modular design of the spacecraft 10 further permits integration and retrofitting of modified modules should the specifications and/or performance requirements of the spacecraft 10 need to be changed to suit the demands of a specific mission.

The fully modular design further permits parallel manufacturing and testing of the various modules 12–18 of the spacecraft 10. By "parallel" manufacturing it is meant that the independent modules 12–18 could be constructed and tested at different locations and then brought to one or more common assembly locations to be assembled, as a final phase of the assembly process, to form the spacecraft 10. This feature significantly increases efficiency in manufacturing the spacecraft 10, in addition to significantly reducing the design-to-market cycle time for derivative spacecraft.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A spacecraft comprising:
   a plurality of functionally and physically substantially independent modules so connected to provide spacecraft functionality and ease of modification for the spacecraft's intended mission and ease of manufacturing, said plurality of substantially independent modules comprising at least:
   a payload module;
   a bus electronics module operably associated with said payload module;
   an electrical power module for providing power to said electronics module and said payload module; and
   wherein at least said payload module is moveable between an assembled position, wherein access to components thereon is restricted, and a service position wherein access to said components is generally unrestricted, without requiring complete detachment of said payload module from said spacecraft during assembly and testing of said spacecraft;
   wherein at least one of said payload module or said bus electronics module is moveable between an assembled position and a service position.

2. The spacecraft of claim 1, further comprising a fully independent propulsion module for providing propulsion for said spacecraft, and supported on said spacecraft in a manner which permits ready detachment therefrom for service and testing purposes.

3. The spacecraft of claim 1, wherein said electrical power module comprises:
   a battery assembly; and
   a solar array assembly operatively coupled to said battery assembly.

4. The spacecraft of claim 1, wherein said payload module may be secured to said spacecraft through the use of a plurality of quick disconnect fasteners.

5. A spacecraft comprising:
   a plurality of functionally and physically substantially independent modules so connected to provide spacecraft functionality and ease of access to and servicing or testing of said plurality of substantially independent modules, said plurality of substantially independent modules comprising at least:
   an independent payload module adapted to be secured to said spacecraft so as to be moveable in a folding manner between an assembled position, wherein access to components thereon is restricted, to a service position, wherein access to said components is substantially readily available, and without requiring significant disassembly of any other of said modules of said spacecraft; and
   an independent bus electronics module operably associated with said payload module and readily moveable in folding fashion relative to said payload module between an assembled position, wherein access to components on said bus electronics module is not readily available, to a service position, wherein access to said components thereon is substantially readily available, and without requiring significant disassembly of electrical, mechanical, fluid carrying or thermal elements interconnecting said payload and bus electronics modules.

6. The spacecraft of claim 4, further comprising an electrical power module for providing power to said bus electronics module and said payload module.

7. The spacecraft of claim 5, wherein said electrical power module includes a functionally independent solar array assembly.

8. The spacecraft of claim 4, further comprising an independent propulsion module adapted to be readily attached to and detached from said spacecraft without requiring significant disassembly of other ones of said modules of said spacecraft.

9. The spacecraft of claim 5, wherein said electrical power module is moveable in a folding fashion between an assembled position and a service position to permit rapid, substantially unimpeded access to subcomponents thereof.

10. A fully modular spacecraft adapted to facilitate servicing and testing of modules thereof without requiring significant mechanical disassembly procedures, said spacecraft comprising:
    a functionally independent electrical power module moveable between an assembled position, wherein components thereon are generally not readily accessible, and a service position, wherein said components thereon are substantially readily accessible, and without requiring significant disassembly or disconnection of mechanical, electrical, fluid carrying or thermal elements connecting said electrical power module with said spacecraft; and
    a functionally independent payload module moveable independently of said electrical power module between an assembled position, wherein access to components thereof is generally restricted, and a service position wherein access to said components thereof is generally unrestricted, and without requiring significant disassembly or disconnection of electrical, mechanical, fluid carrying or thermal elements connecting said payload module with said spacecraft.

11. The spacecraft of claim 9, wherein electrical power module comprises a solar array assembly adapted to be moved with said electrical power module between said assembled and service positions.

12. The spacecraft of claim 9, wherein said payload module is secured to said spacecraft with a plurality of quick disconnect fasteners.

13. The spacecraft of claim 9, further comprising a fully independent bus electronics module adapted to be moved from an assembled position, wherein components thereof are not readily accessible, to a service position wherein said components thereon are substantially readily accessible, and without requiring significant disassembly of electrical, mechanical, fluid carrying or thermal elements coupling said electronics module to said spacecraft.

14. The spacecraft of claim 9, further comprising a functionally independent propulsion module adapted to be readily coupled to and removed from said spacecraft.

15. A method for forming a modular spacecraft, said method comprising:
    providing a functionally independent bus electronics module; and
    securing said bus electronics module to a portion of said spacecraft such that said bus electronics module is movable in a folding fashion between an assembled position, wherein components of said bus electronics module are generally not readily accessible, and a service position, wherein said components thereon are substantially readily accessible for service and inspection without requiring significant disassembly of elements connecting said bus electronics module to other components of said spacecraft.

16. The method of claim 14, further comprising the step of securing a functionally independent payload module to said spacecraft such that said payload module can be moved in a folding fashion between an assembled position and a service position without requiring significant disassembly of elements connecting said payload module to said spacecraft.

17. The method of claim 14, further comprising the step of securing a functionally independent propulsion module to said spacecraft.

18. For a spacecraft, a fully independent bus electronics module adapted to be readily moved in a folding fashion from an assembled position on said spacecraft, wherein components thereon are not readily accessible, to a service position, wherein said components are substantially accessible for service, testing or inspection, and wherein said folding movement is accomplished without significant disassembly of elements coupling said bus electronics module to said spacecraft.

19. The spacecraft of claim 17, wherein said independent bus electronics module is secured to a portion of said spacecraft by a plurality of quick disconnect fasteners enabling said bus electronics module to be quickly mechanically uncoupled from said portion of said spacecraft.

20. A fully modular spacecraft constructed to allow quick access to a plurality of modules comprising said spacecraft, to thereby enable rapid service and testing of said spacecraft, and without requiring significant disassembly of elements operatively connected to said plurality of modules, said spacecraft comprising:
 a payload module;
 a fully modular bus electronics module secured to said payload module by a plurality of mechanical, quick release fasteners and constructed to be readily movable between an assembled position and a service position without requiring significant disassembly or disconnection of said elements interconnecting said bus electronics module with other components of said spacecraft.

21. The spacecraft of claim 19, wherein at least a portion of said payload module is coupled to said spacecraft by an additional plurality of said mechanical, quick release fasteners and constructed to be readily movable between an assembled position and a service position without requiring significant disassembly of said elements interconnecting said payload module with other components of said spacecraft.

22. The spacecraft of claim 19, further comprising a fully functional, independent electrical power module secured to said spacecraft in a manner to permit movement, in a folding fashion, between an assembled position and a service position.

23. A fully modular spacecraft constructed to allow quick and convenient access to a plurality of modules comprising said spacecraft, to thereby enable rapid service and testing of said spacecraft, and without requiring significant disassembly or separation of elements interconnecting said plurality of modules, said spacecraft comprising:
 a bus electronics module;
 a fully modular payload module secured to said electronics module by a plurality of quick release fasteners and constructed to be readily movable between an assembled position and a service position without requiring significant disassembly of said elements interconnecting said payload module with other components of said spacecraft.

24. The spacecraft of claim 21, further comprising a functionally independent electrical power module.

25. The spacecraft of claim 22, wherein said electrical power module is moveable in a folding fashion between an assembled position and a service position, wherein movement into said service position allows substantially unimpeded access to components disposed on said electrical power module.

26. The spacecraft of claim 21, wherein said bus electronics module is moveable in a folding fashion relative to said payload module, between an assembled position and a service position, wherein said service position permits substantially unimpeded access to components disposed on said bus electronics module.

27. A spacecraft comprising:
 a plurality of functionally and physically substantially independent modules so connected to provide spacecraft functionality and ease of modification for the spacecraft's intended mission and ease of manufacturing, said plurality of substantially independent modules comprising at least:
 a payload module;
 a bus electronics module operably associated with said payload module;
 an electrical power module for providing power to said electronics module and said payload module;
 and wherein said payload module comprises a plurality of payload panels; at least one of said payload module or said bus electronics module being coupled so as to be moveable between an assembled position and a service position to enable access to other ones of said modules during assembly and testing of said spacecraft.

* * * * *

UNITED STATES PATENT AND TRADEMARK OFFICE
CERTIFICATE OF CORRECTION

PATENT NO.    : 6,293,499 B1
DATED         : September 25, 2001
INVENTOR(S)   : MacGillivray et al.

It is certified that error appears in the above-identified patent and that said Letters Patent is hereby corrected as shown below:

Column 12,
Line 7, after "of" "claim 4" should be -- claim 5 --
Line 10, after "of" "claim 5" should be -- claim 6. --
Line 13, after "of" "claim 4" should be -- claim 5 --
Line 18, after "of" "claim 5" should be -- claim 6. --
Line 44, after "of" "claim 9" should be -- claim 10. --
Line 48, after "of" "claim 9" should be -- claim 10. --
Line 51, after "of" "claim 9" should be -- claim 10. --
Line 59, after "of" "claim 9" should be -- claim 10. --

Column 13,
Line 9, after "of" "claim 14" should be -- claim 15. --
Line 15, after "of" "claim 14" should be -- claim 15. --
Line 27, after "of" "claim 17" should be -- claim 18. --
Line 46, after "of" "claim 19" should be -- claim 20. --

Column 14,
Line 1, after "of" "claim 19" should be -- claim 20. --
Line 20, after "of" "claim 21" should be -- claim 23. --
Line 22, after "of" "claim 22" should be -- claim 24. --
Line 27, after "of" "claim 21" should be -- claim 23. --

Signed and Sealed this

Twentieth Day of August, 2002

*Attest:*

*Attesting Officer*

JAMES E. ROGAN
*Director of the United States Patent and Trademark Office*